United States Patent [19]

Roth

[11] 4,232,788

[45] Nov. 11, 1980

[54] AUTO-EXPANSIBLE CUSHIONING BAG

[76] Inventor: Jacques Roth, 13, quai Mullenheim, Strasbourg (Bas-Rhin), France

[21] Appl. No.: 8,190

[22] Filed: Jan. 31, 1979

[30] Foreign Application Priority Data

Feb. 3, 1978 [FR] France ............................... 78 03732
Dec. 14, 1978 [FR] France ............................... 78 37019

[51] Int. Cl.² ...................... B65D 81/02; B65D 85/30
[52] U.S. Cl. ................................... 206/524; 206/241; 206/523; 206/591; 428/35; 156/78
[58] Field of Search .................... 428/35; 156/78, 310; 206/591, 524, 241, 523

[56] References Cited

U.S. PATENT DOCUMENTS

| 3,451,534 | 6/1969 | Remer et al. | 206/523 |
| 3,485,347 | 12/1969 | McGill et al. | 206/524 |
| 3,598,671 | 8/1971 | Wortman | 156/310 |
| 3,966,521 | 6/1976 | Patton et al. | 156/78 |
| 4,087,389 | 5/1978 | Coppola | 206/591 |

FOREIGN PATENT DOCUMENTS 2649804 3/1978 Fed. Rep. of Germany .......... 206/524

Primary Examiner—George F. Lesmes
Assistant Examiner—E. Rollins Buffalow
Attorney, Agent, or Firm—Young & Thompson

[57] ABSTRACT

An auto-expansible cushioning bag constituted by a completely closed envelope of flexible, impervious and transparent material, and by at least two hermetically closed sachets, likewise of flexible, transparent and impervious material, which are integrated into the envelope and contain the ingredients necessary for the production of a foam of polyurethane or the like. The one sachet contains a mixture of polypropylene glycol ("polyol"), activators, water from which $CO_2$ gas is generated to cause the expansion, and possibly a supplementary inflating agent, such as trichlorofluoromethane, and the other contains an isocyanate.

7 Claims, 25 Drawing Figures

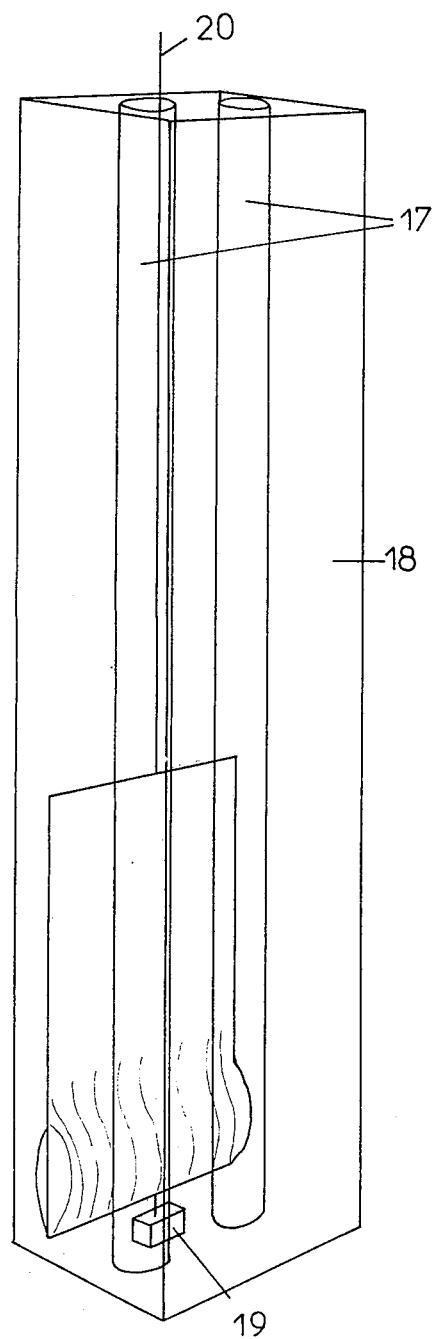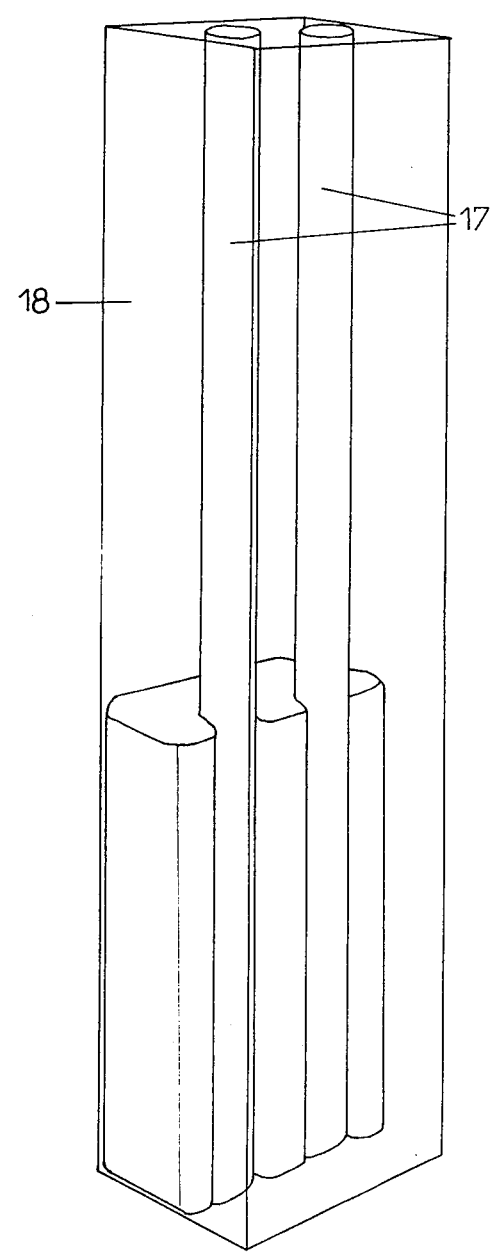

AUTO-EXPANSIBLE CUSHIONING BAG

INTRODUCTION AND BACKGROUND OF THE INVENTION

The present invention relates to an auto-expansible cushioning bag useful in the field of wrapping, insulation and the filling of cavities, by means of cushioning, insulating or filling materials.

More particularly the invention has for its object the provision of such a bag which is useful e.g. for protectively embedding fragile articles and other purposes.

For filling and packaging, generally straw, foam waste, wood shavings or the like are used. Likewise for the insulation of pipes or conduits it is usual to surround these with insulating materials such as glass wool or rock wool. However these insulating, filling and packaging processes most frequently involve a significant generation of dust, and therefore have a soiling effect, and necessitate relatively great expense for their utilization.

To diminish these drawbacks it has been proposed to utilize polyurethane foam in the form of rigid or semi-rigid half-shells, or again to cast the said polyurethane foam in situ.

Thus it is possible to pack an object in sandwich fashion between two half-shells which have each been provided during manufacture with a half impression of the object to be packed, the cushioning of which is thus effected in a cocoon of foam made to measure. The insulation of a pipe will be effected in the same manner, by enveloping the pipe between two half-shells the cavities of which are molded to the form and dimensions of the pipe to be insulated.

In the case of packaging by in situ casting, the object to be packed is previously placed in a hermetic bag of polyethylene, then is introduced into a wooden or cardboard box, and a foaming mixture of polyurethane is cast, with the aid of a special machine, into the said box. This mixture then expands and polymerizes, intimately surrounding the object in its lower and lateral parts. After this first operation the covering of the upper part of the object is effected by a second casting in such manner as to imprison the object entirely in a cocoon of foam. The insulation of pipes is effected in the same manner, with the exception however of the provision of a shuttering around the pipe, serving as temporary receptacle for the foam. The process of in situ casting of the polyurethane foam is furthermore of relatively great interest for the filling of the cavities of hollow bodies for the purpose of their thermal and/or acoustic insulation or their solidification.

However, in the case of insulation or packaging between two rigid or semi-rigid half-shells, it is necessary to create a special and costly mold for each object to be packed or for each pipe to be insulated, the half-shells further having to be manufactured in a specialized works, then dispatched and stored in great volume by the user.

Finally the in situ casting process, although possessing the advantage of not necessitating a storage area, nor a mold, utilizes a special and sophisticated foaming machine which becomes fouled at every prolonged stoppage, and the chemical products utilized, which are stored in vats, must be utilized rapidly once these vats are opened by reason of their sensitivity to humidity, which prevents brief and spaced utilizations. Furthermore, the utilizer of this process must be perfectly acquainted with the technique of the foaming machine and the chemical behavior of polyurethane. Moreover, the casting of the foaming mixture of polyurethane, which is very liquid at the beginning, is always critical since frequently a part of the mixture leaks through holes or fissures in the flaps of the cardboard boxes intended for packaging, or the shuttering for insulation. These leakages can have serious consequences since the foaming mixture in the course of expansion is sticky and noxious, risking the causing of various damage. Finally, by reason of the state of the foam in the course of expansion no manipulation of this foam is possible, and thus it can only expand freely.

The present invention has the further purpose of diminishing these drawbacks.

More specifically, the invention is intended to provide an auto-expansible cushioning bag which permits of retaining all the advantages of in situ casting and of direct manufacture on the user's premises of molded objects such as cushioning corner pieces and half-shells of polyurethane foam, without a special installation.

BRIEF SUMMARY OF THE INVENTION

The bag according to the invention is essentially constituted by a completely closed envelope of flexible, impervious and transparent material, and by at least two hermetically closed sachets, likewise of flexible, transparent and impervious material, which are integrated into the envelope and contain the ingredients necessary for the production of the polyurethane foam, namely the one sachet contains a mixture of polyol, activators, water from which $CO_2$ gas is generated to cause the expansion and possibly a supplementary inflating agent, such as trichlorofluoromethane, and the other contains an isocyanate.

FURTHER DESCRIPTION AND ADVANTAGES OF THE INVENTION

According to one embodiment of the invention, the envelope of the bag is provided in its upper part, advantageously over two-thirds of its height, with vent holes over its entire surface, and/or in the lateral weld lines.

According to one variant of embodiment of the invention the auto-expansible bag is provided over its entire circumference with a drip flap which can be welded to a corresponding drip flap of a corresponding bag in the wrapping of an object.

The invention can be used by holding the envelope in a vertical position, in such manner that the two sachets are situated in its lower part, in bursting the sachets by a vigorous pressure to expel the chemical solutions which flow into the bottom of the envelope, then in mixing these solutions by friction between the walls of the envelope for a period of 40 to 45 seconds, next in spreading the foam, at the beginning of expansion, for 3 to 5 seconds, between the walls of the envelope, and finally after the foam has reached about one-fifth of its expansion, either in depositing the bag in a box, covering it with the object to be wrapped in the case of the carrying out of a wrapping, a second bag being placed over the object, or in winding it around a pipe to be insulated, or in introducing it into a shaping device, the foam then carrying out its final expansion and polymerizing to adapt itself intimately to the forms of the objects or cavities.

The invention will be better understood from the following description which refers to preferred forms of embodiment given by way of non-limitative examples, which are explained with reference to the accompanying diagrammatic drawings.

BRIEF DESCRIPTION OF THE VIEWS IN THE DRAWINGS

In the said drawings:

FIGS. 16 and 17 represent the manner of insulation of vertical pipes mounted in a sheath;

DETAILED DESCRIPTION OF THE PREFERRED EMBODIMENTS

Figure 1:
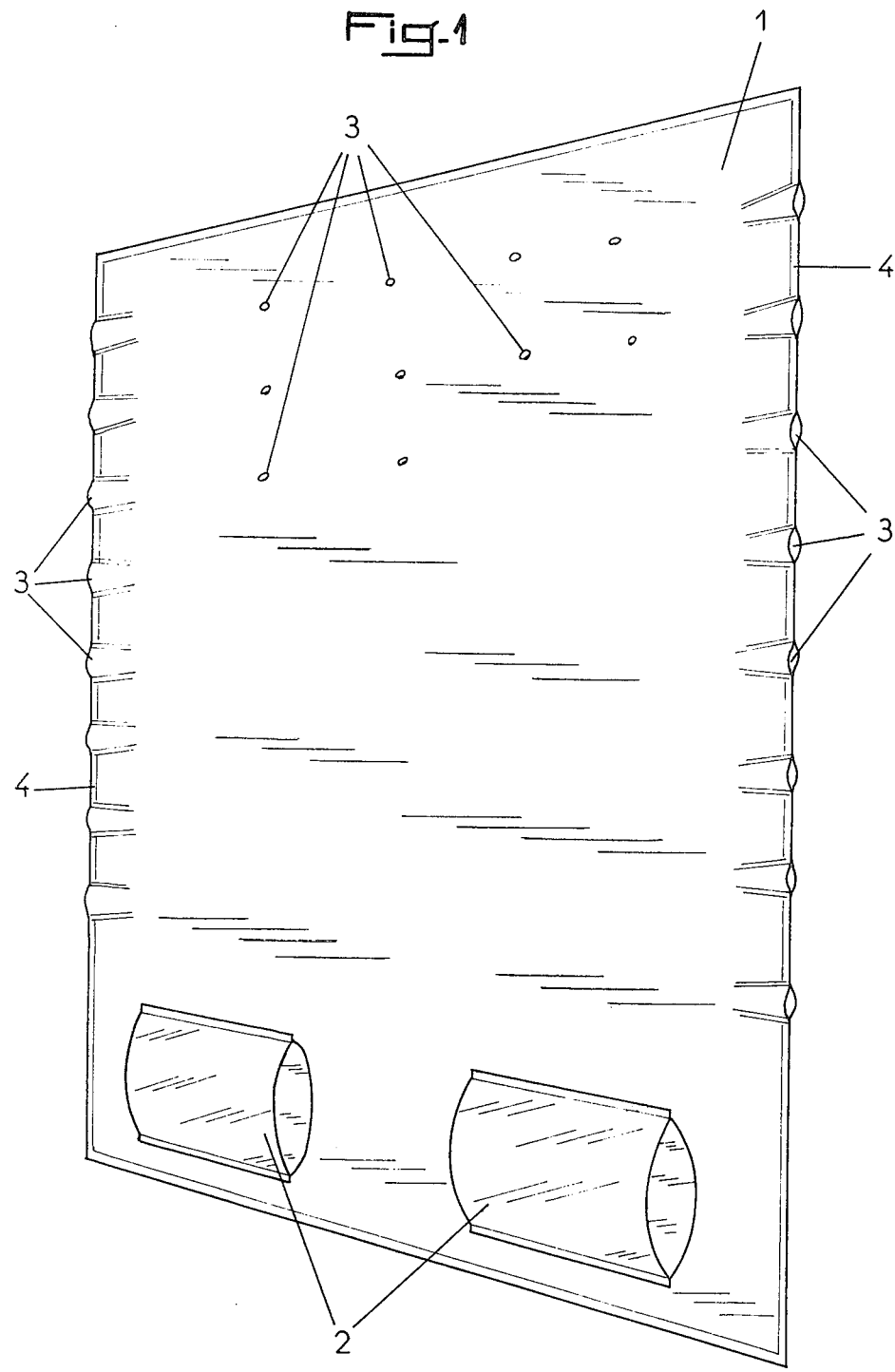
FIG. 1 is a perspective view of a bag according to the invention.
Figure 2:
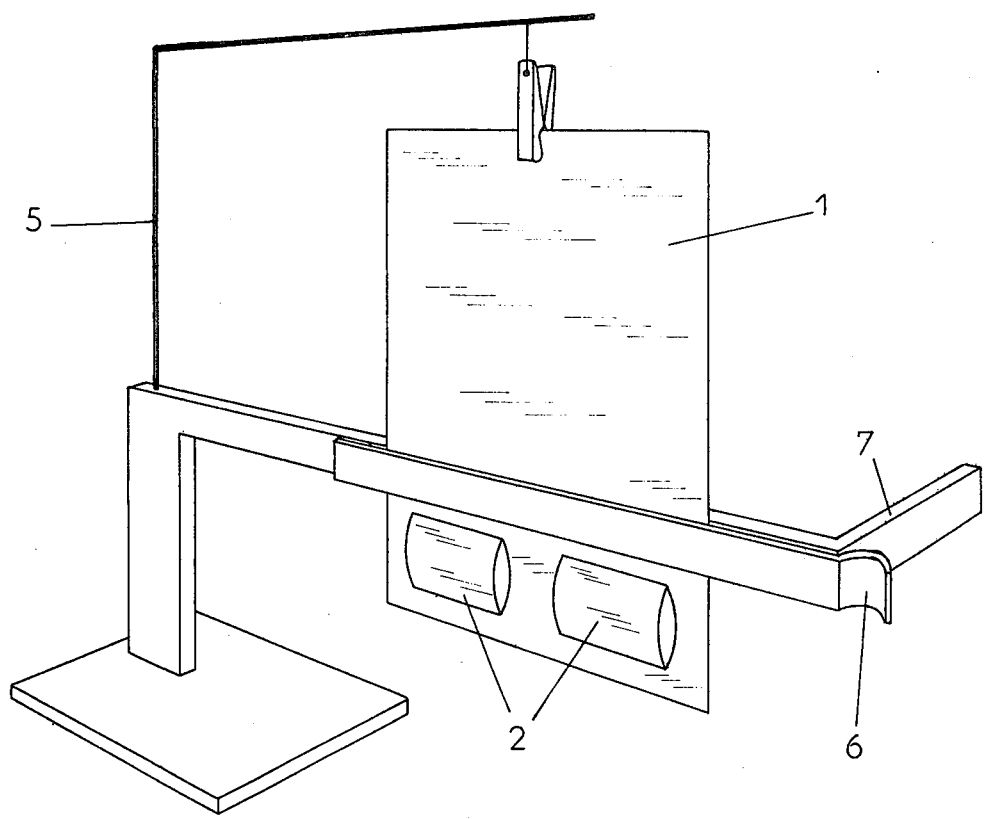
FIGS. 2 and 3 are perspective views representing the bag in two possible positions for its utilization.
Figure 3:
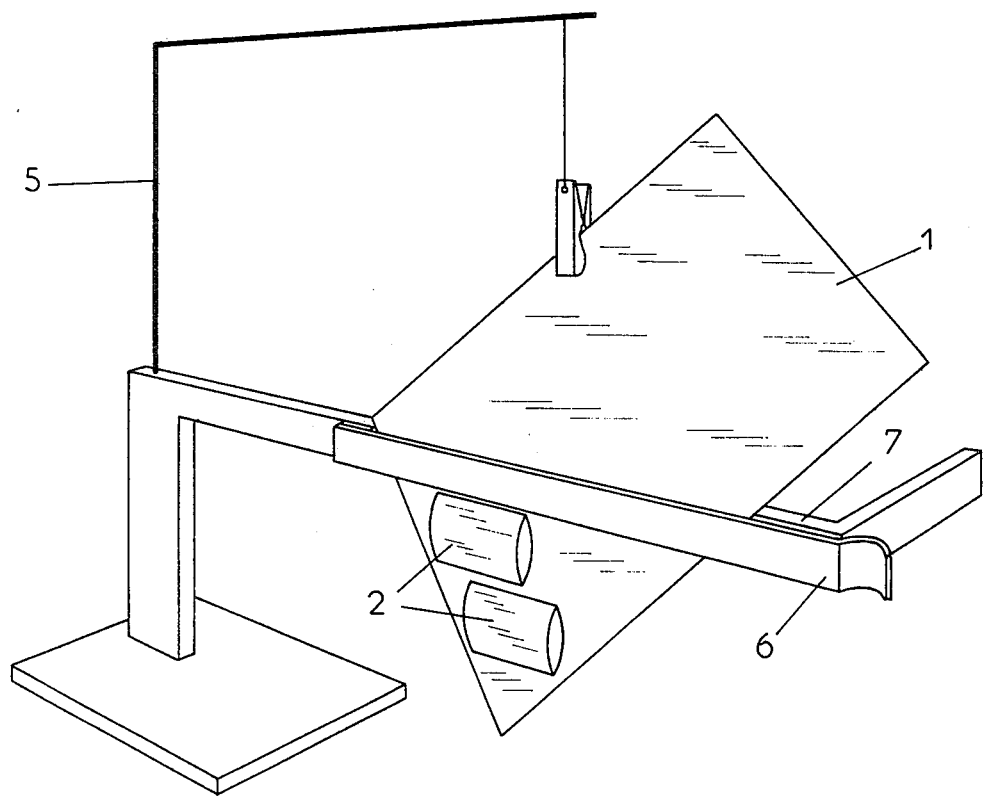
Figure 4:
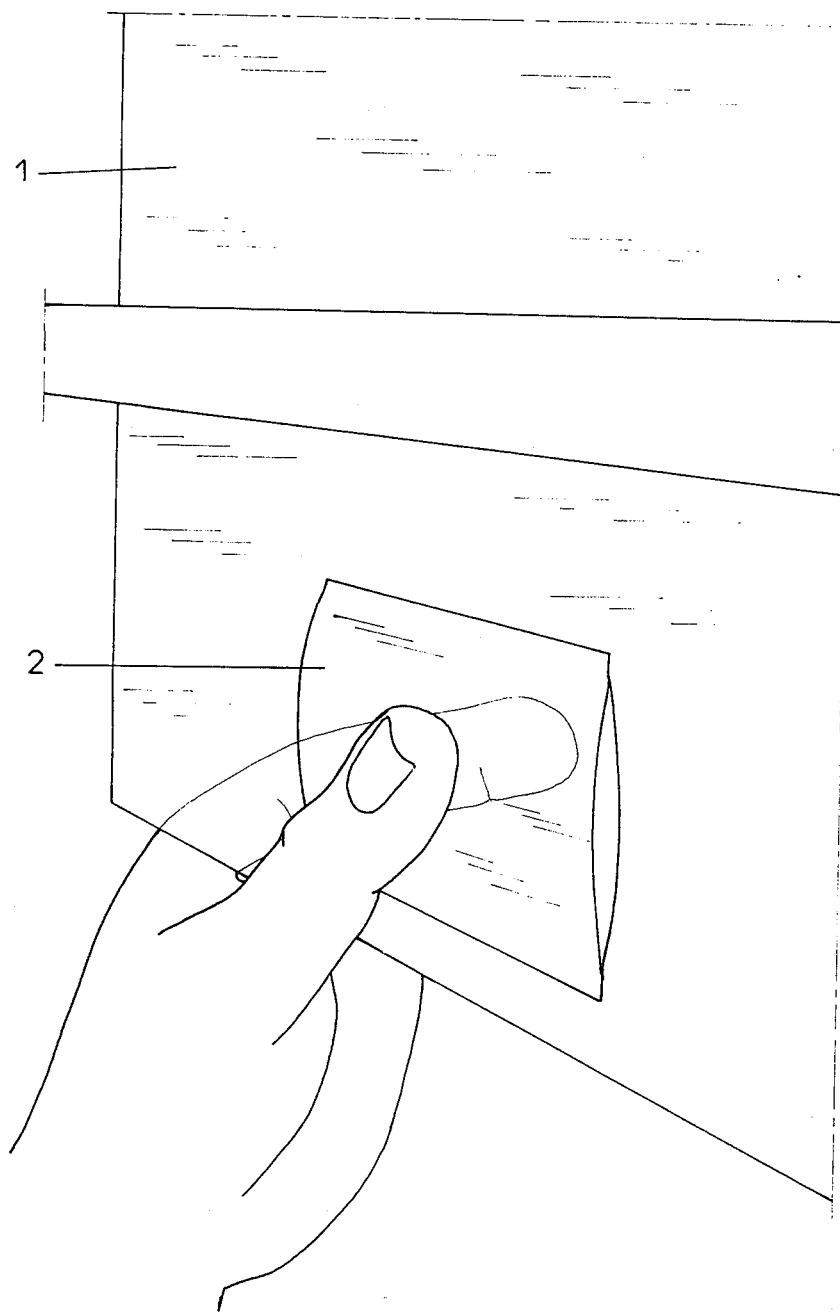
FIG. 4 shows the operation of bursting a sachet.

In accordance with the invention and as shown more particularly by way of example by FIG. 1 of the accompanying drawings, the auto-expansible bag is constituted essentially by an envelope 1 which is completely closed over its edges by a thermal weld of a width between 1 and 3 mm., of a flexible, impervious and transparent material, and by at least two hermetically closed sachets 2 likewise of flexible, transparent and impervious material, containing the ingredients necessary for the manufacture of the polyurethane foam and integrated into the envelope 1.

The envelope 1 is preferably constituted by a film of high-density polyethylene or by an analogous material, of a thickness of 0.10 mm., and is provided preferably over two-thirds of its height in its upper part with small vent holes 3 distributed over its whole surface, and/or in the lateral weld lines 4, which have a diameter advantageously between 0.5 and 2 mm.

One of the sachets 2 contains a mixture of polyol, activators, water from which $CO_2$ gas is generated to cause the expansion and possibly a supplementary inflating agent such as trichlorofluoromethane, and the other contains an isocyanate. Thus the bag according to the invention contains all the ingredients necessary for the manufacture of a foam of polyurethane or the like. The sachets 2 are preferably constituted by polypropylene film or the like, of a thickness between 0.02 and 0.05 mm., and are hermetically closed by a thermal weld of a width of 1 to 3 mm.

The utilization of the bag according to the invention will be explained below with reference to FIGS. 2 to 12.

Figure 5:
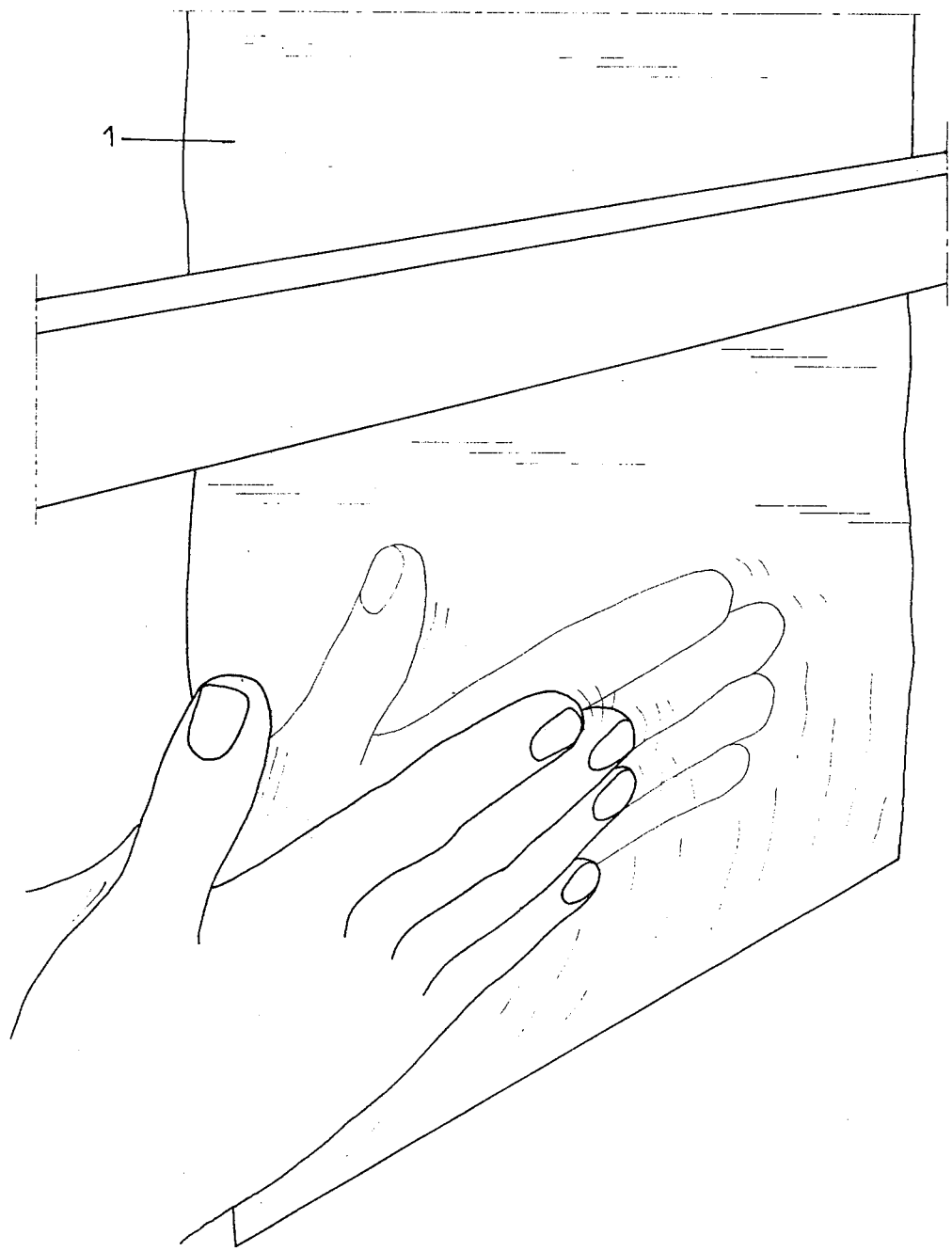
FIG. 5 represents the operation of mixing of the products.
Figure 6:
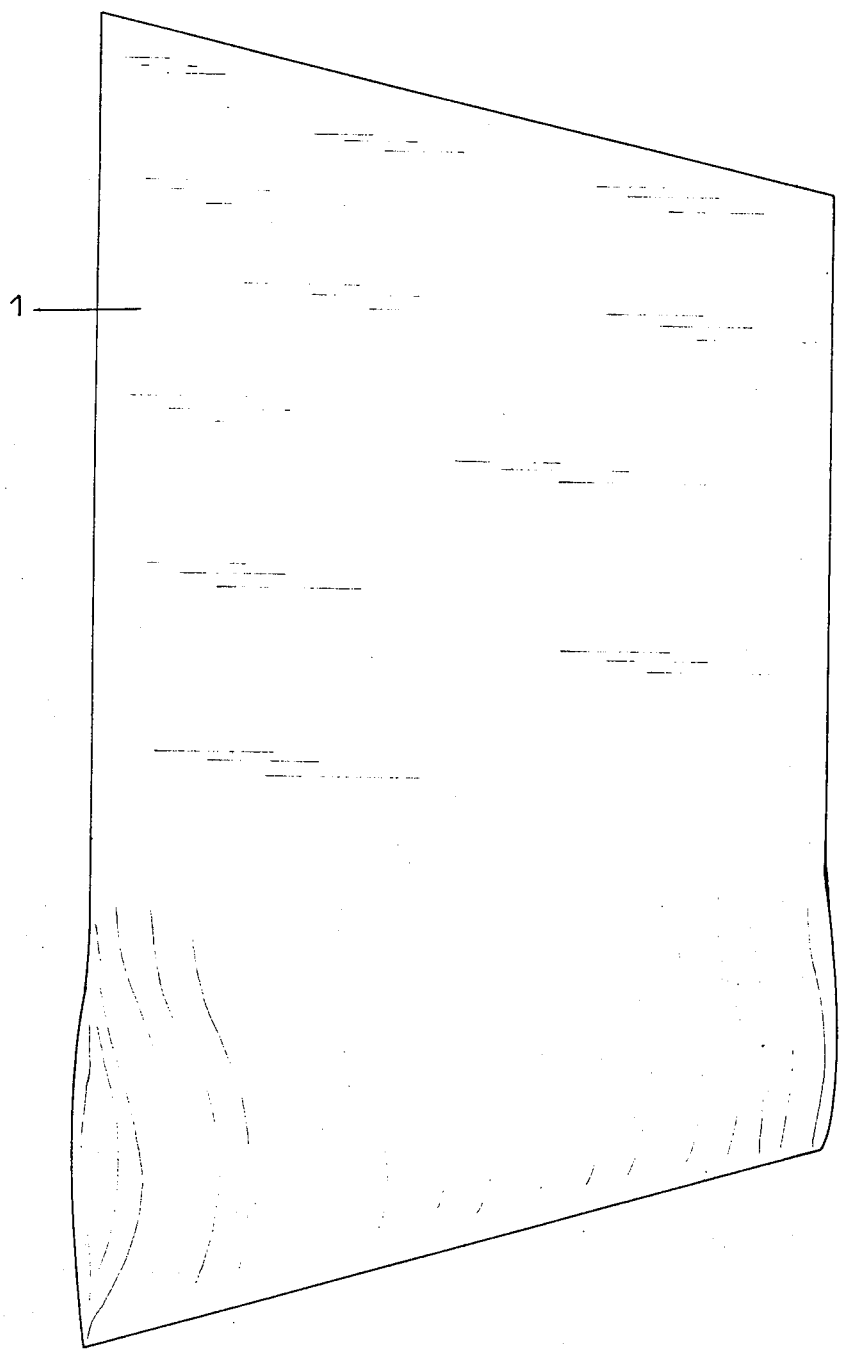
FIG. 6 shows the bag at the beginning of the expansion of the foam.

The auto-expansible bag is suspended from a bracket 5 so that the sachets 2 are situated in the lower part of the envelope if the latter is suspended vertically (FIG. 2), or in the lower corner if the envelope is suspended obliquely (FIG. 3), and is gripped between two blades 6 and 7 of the bracket 5 at about one-fifth to one-third from its base. The operator then expels from the sachets 2 on the one hand the mixture of product hereinafter called activated polyol and on the other hand the isocyanate, so that they flow into the bottom of the bag which serves as mixing chamber. This operation is carried out either manually by a vigorous digital pressure (FIG. 4), or by means of a gripper. The activated polyol and the isocyanate are then intimately mixed for a period of 40 to 45 seconds, the operator placing his hands for this purpose on each side of the mixing chamber and rubbing the said mixture between the walls of the envelope 1 with a linear and/or circular reciprocating motion. This rubbing is facilitated by the flexibility of the polyethylene film constituting the envelope 1, and the transparency of this film further permits of continuously checking the quality of the mixture (FIG. 5). After this mixing has been effected, the operator withdraws the bag from the bracket and the said mixture of activated polyol and isocyanate expands freely.

Figure 7:
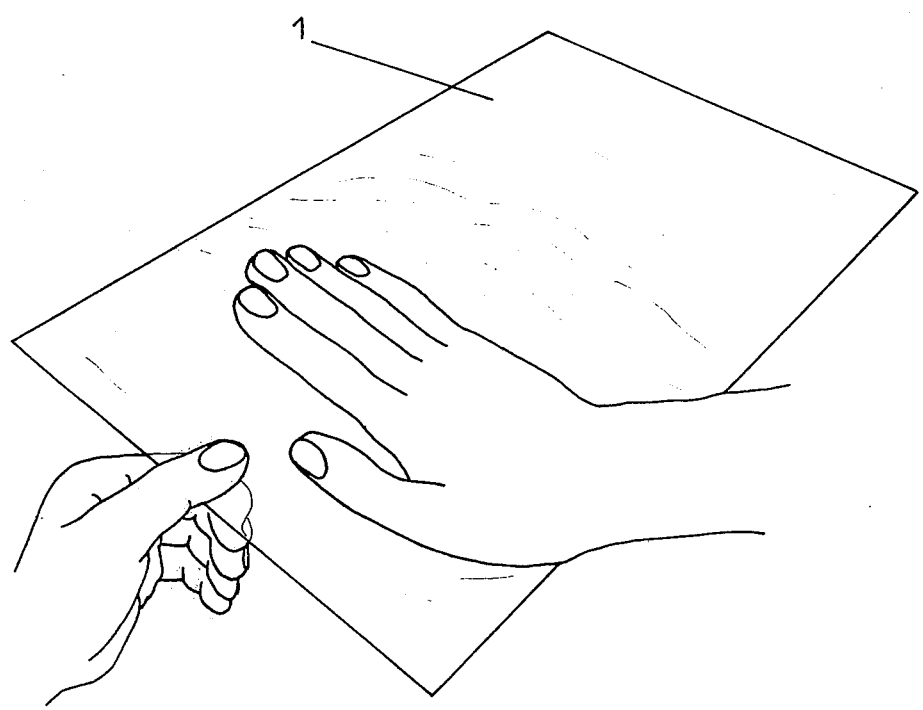
FIG. 7 shows the operation of spreading of the foam.
Figure 8:
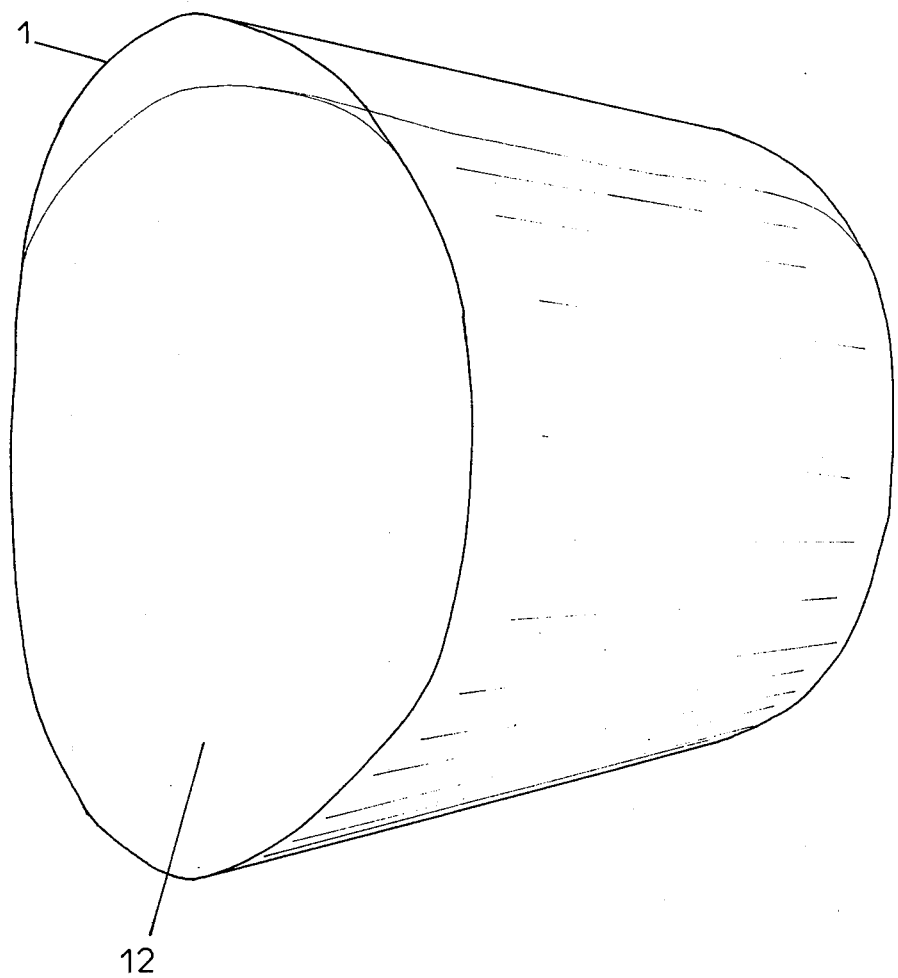
FIG. 8 represents the bag after complete expansion of the foam.
Figure 9:
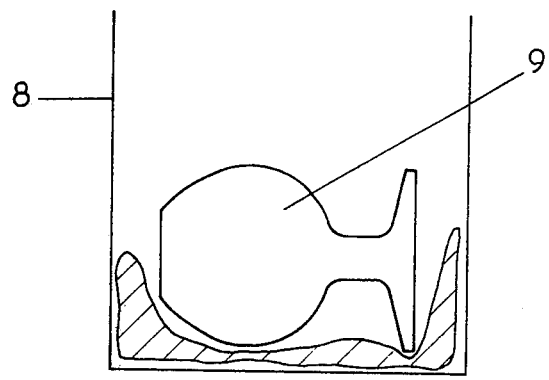
FIGS. 9 to 12 show the various stages of wrapping of an object, in section.
Figure 10:
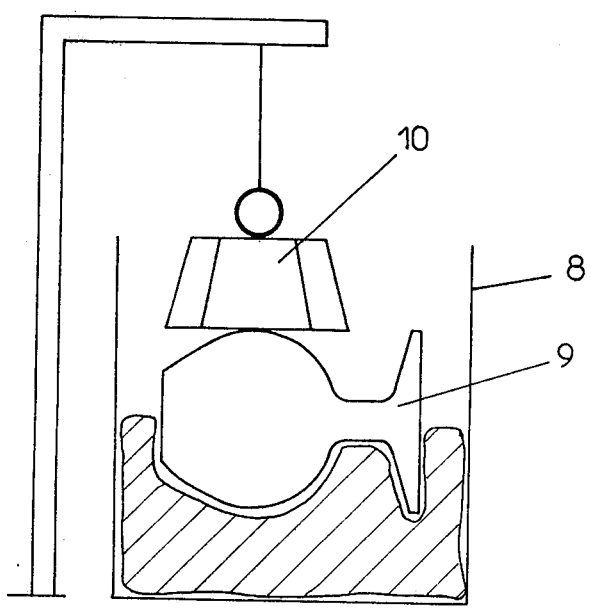
Figure 11:
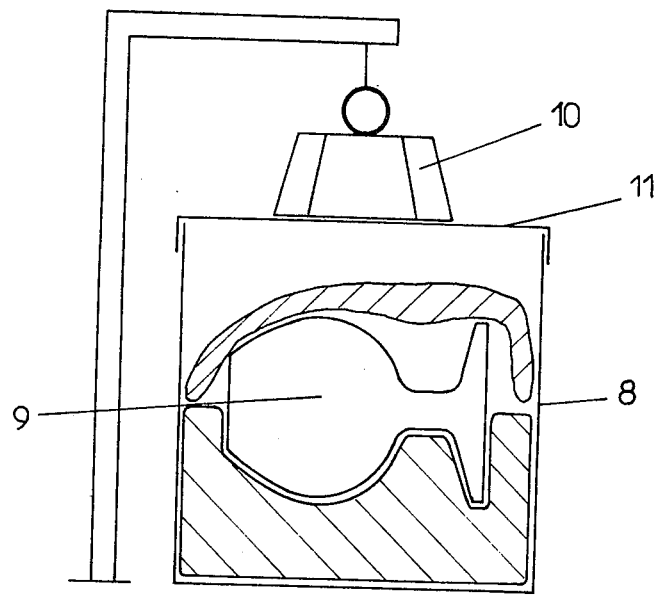
Figure 12:
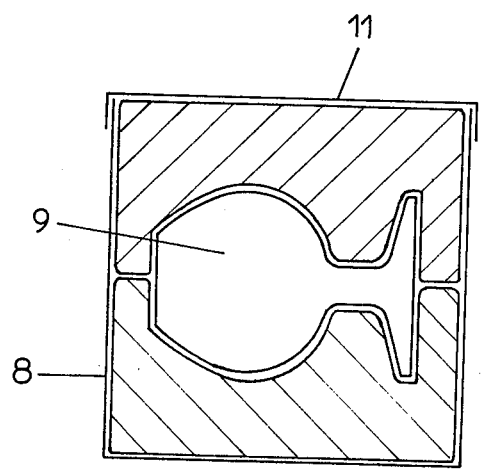

The foam reaches 10 to 20% of its final volume in 10 to 15 seconds (FIG. 6) and in this stage is extremely liquid and creamy, so that it can easily be spread and distributed as desired in the envelope 1 by the operator's hand acting through the flexible wall for about 3 to 5 seconds (FIG. 7). The operator then places the bag in the bottom of a cardboard box 8 and places the object to be wrapped on the said bag, for example a vase 9 (FIG. 9). This object 9 is then weighted, either by application of the hand or by means of a weight 10 or a sand bag or the like, in such manner that it impresses itself into the foam during its formation (FIG. 10). The expansion of the foam continues after the introduction of the bag into the box 8, for about 35 to 40 seconds, to its final volume, then the foam polymerizes during a period of about 45 seconds. In this stage the bag has completely assumed the forms of the lower part of the object 9 to be wrapped. For the wrapping of this object 9 the operator utilizes a second bag, analogous with the first, and proceeds again in the same manner to produce the upper part of the cushioning. After introduction of the bag in the course of expansion (FIG. 10), the operator closes the box 8 with a lid 11 (FIG. 11), possibly loading it with the weight 10, in order to prevent it from being forced open by the expanding foam. After complete expansion and polymerization of the second bag, the weight 10 can be withdrawn, the two bags having adapted themselves to all the shapes of the object 9 and forming a protective cocoon (FIG. 12).

The foam 12 contained in the envelope 1 occupies only about 80% of the volume of the envelope 1 after complete expansion (FIG. 8), so as to leave a facility for lodgement of the object to be wrapped, or of the pipe or the like to be insulated.

Figure 13:
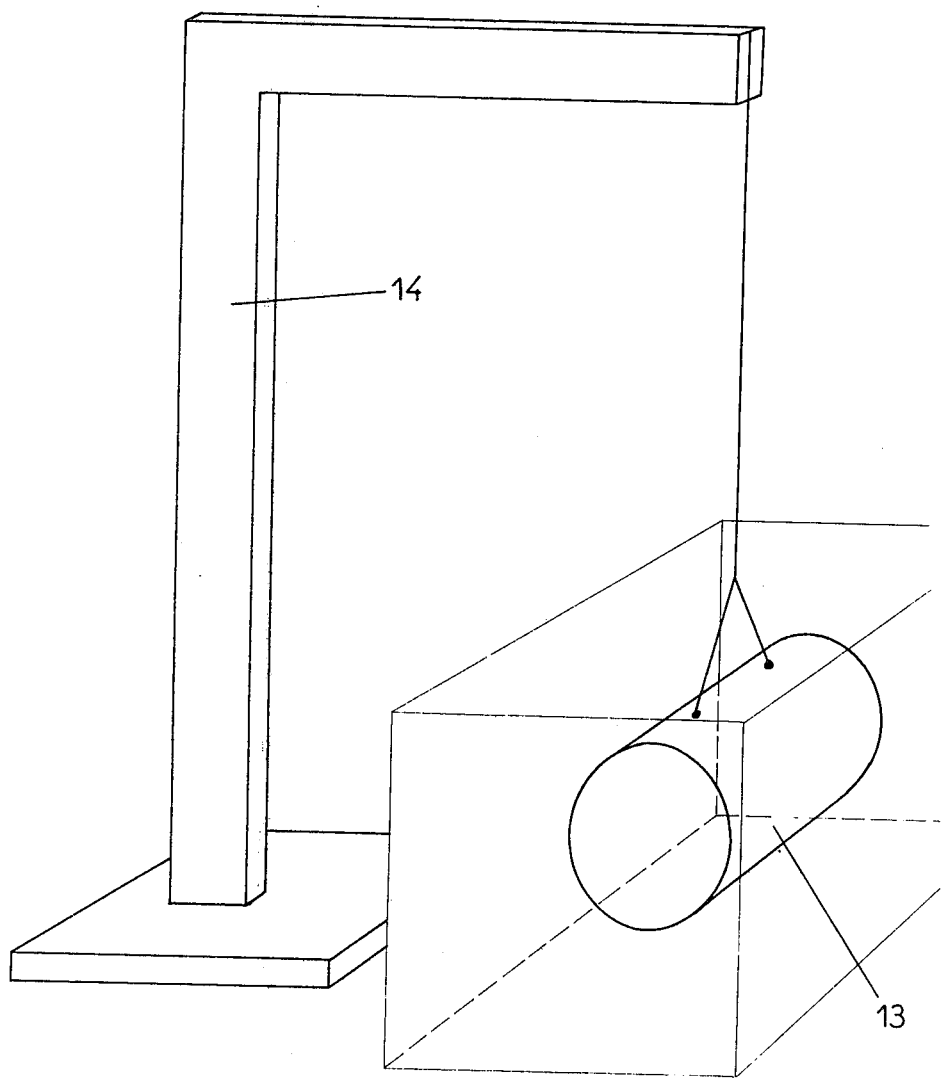
FIG. 13 is a perspective view representing the manner of wrapping a piece of high weight and large dimensions.

In the case of the wrapping of a heavy object 13 (FIG. 13) such as a motor or the like, this object must be supported for example by suspension from a bracket 14, instead of being weighted, as its own weight is largely sufficient to effect a perfect impression in the bag.

Figure 14:
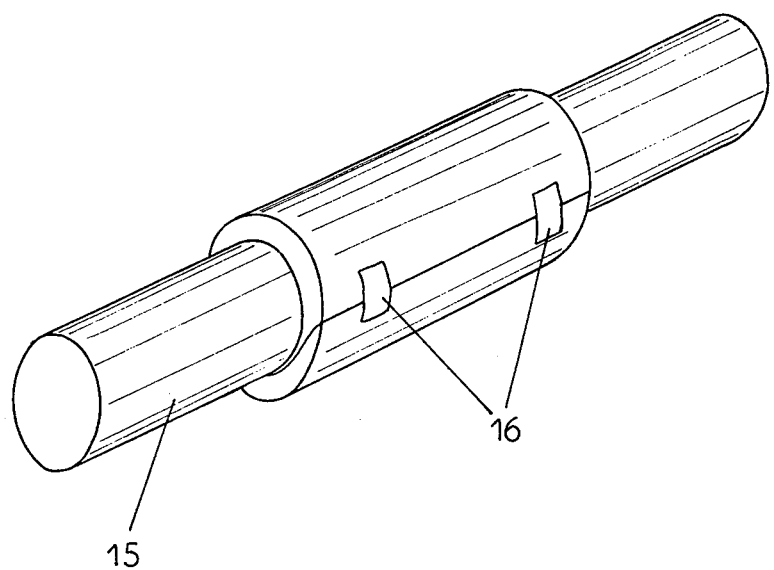
FIGS. 14 and 15 show the insulation of a pipe by means of the bag according to the invention.
Figure 15:
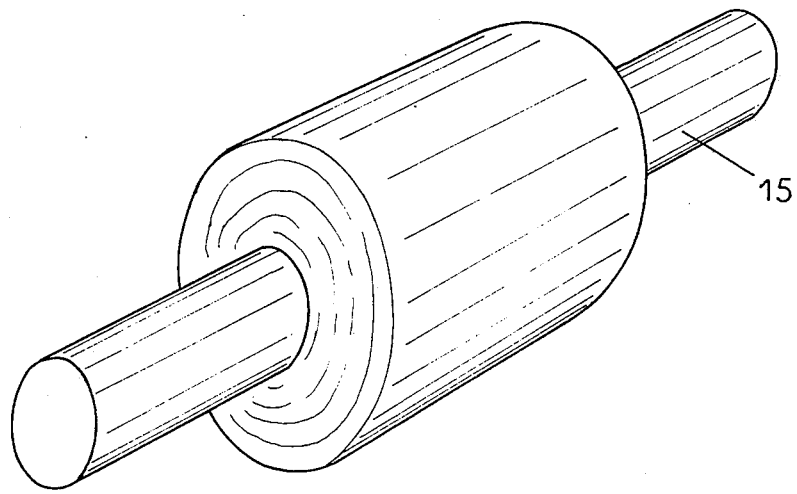

In the case of the insulation of a pipe 15 or the like (FIGS. 14 and 15), the operator repeats the same operations as described above, and after the foam has been expanded to about 20% and spread, the bag is wound around the pipe, the extremities being held to one another by means of adhesive strips 16, strings or any other fixing device. The expansion and polymerization proceed then over the pipe, which is engaged in a sheath of foam (FIG. 15).

In the case of the insulation of vertical pipes 17 mounted in a sheath 18 of great depth, the operator introduces the bag in the course of expansion into the sheath 18, loading it at its lower part with a weight 19 and retaining it with a string 20 or the like (FIG. 16). After complete expansion and polymerization of the foam the pipes 17 are partially sheathed by foam (FIG. 17) and the total insulation of these pipes will be obtained by introduction of a second bag. Thus by introducing a plurality of auto-expansible bags in succession into a sheath of great depth it is possible completely to insulate the pipes situated therein.

Figure 18:
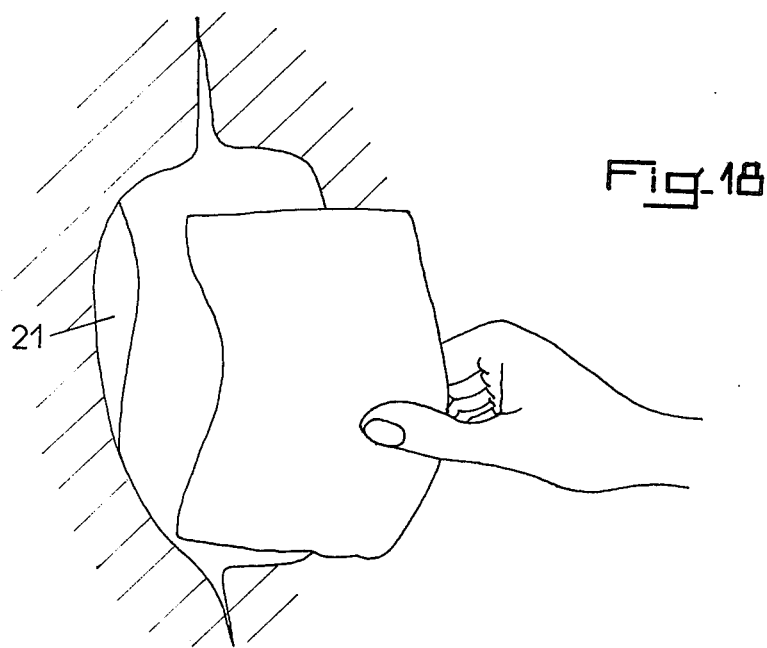
FIGS. 18 and 19 show the filling of a cavity.
Figure 19:
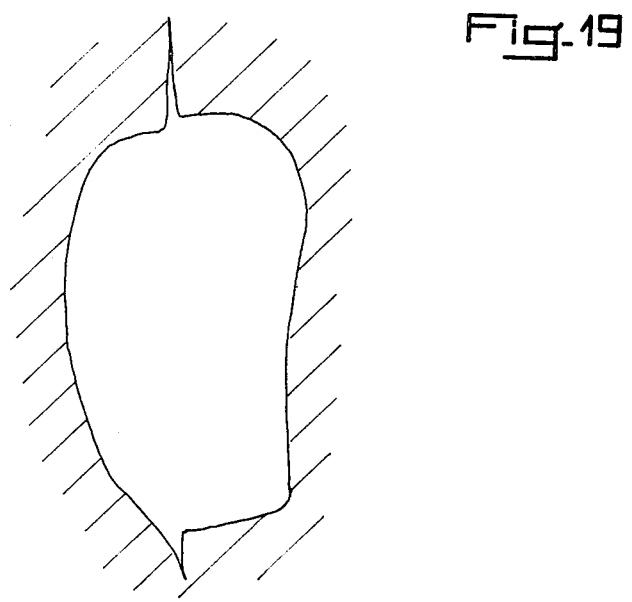

The bag according to the invention likewise permits the stopping of cracks or holes 21 in a wall or the like (FIG. 18) by simple introduction of the bag in the course of expansion into the said crack, which is plugged in all its reliefs and contours after complete expansion and polymerization (FIG. 19).

Figure 20:
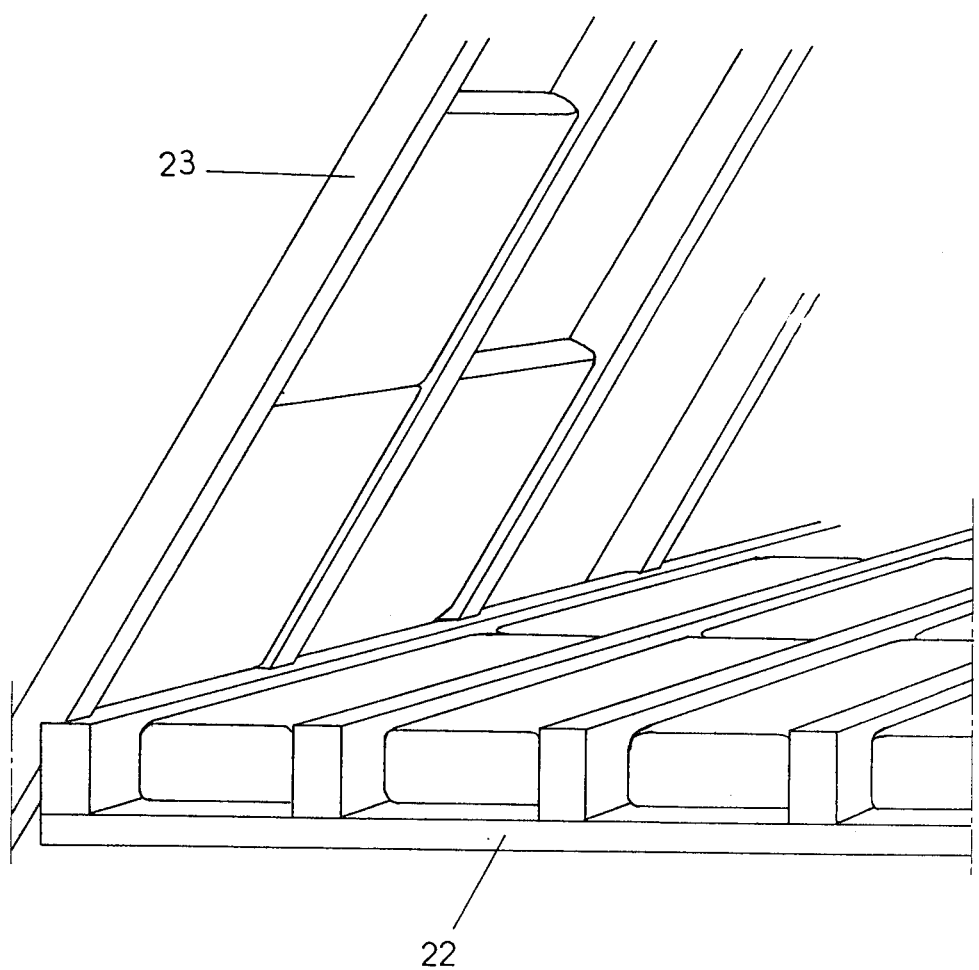
FIG. 20 represents a manner of insulation of roof tiles.

By virtue of the invention it is likewise possible to insulate roofs, as represented in FIG. 20. The bags in the course of expansion are then placed between the planks of the floor 22 and fixed between the rafters of the roofing 23, effecting a perfect insulation after complete expansion and polymerization.

Figure 21:
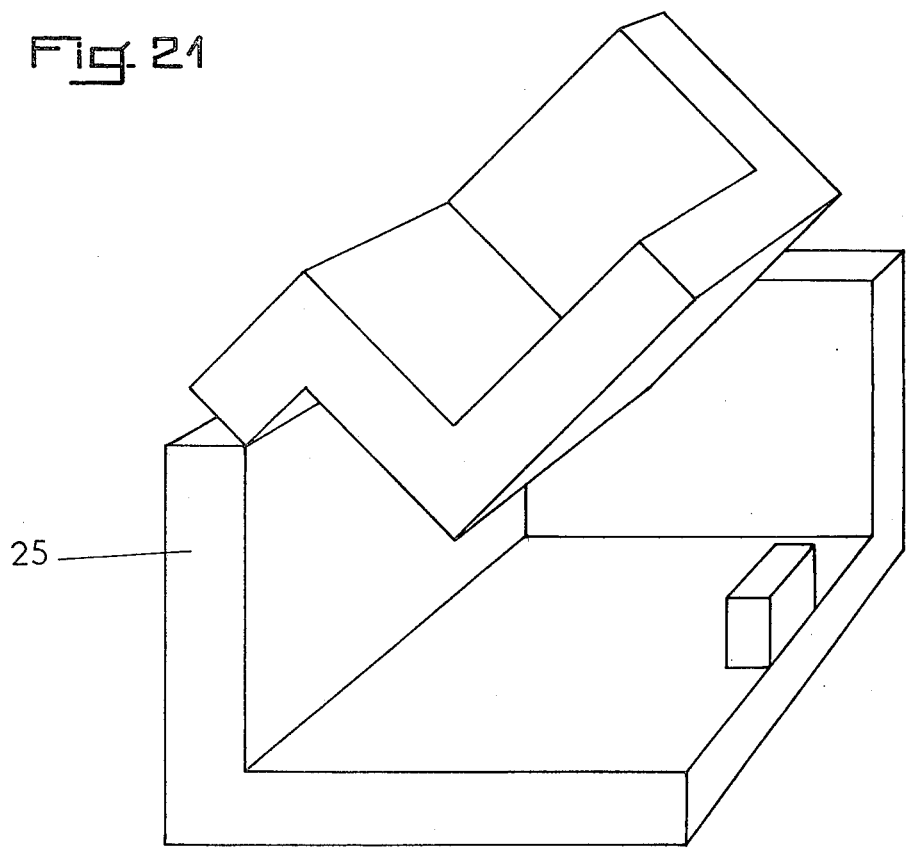
FIG. 21 is a perspective view of a shaping device for the formation of molded pieces.
Figure 22:
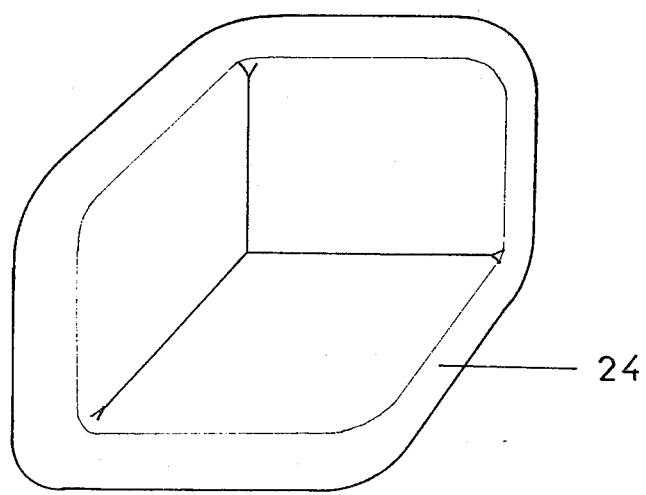
FIG. 22 represents a molded piece obtained by means of the shaping device according to FIG. 21.

Finally, the invention also permits the realization of molded pieces such as half-shells or cushioning corner pieces 24 (FIG. 22) by introduction of the bag in the course of expansion into a shaping device 25 (FIG. 21). After complete expansion and polymerization, the shaping device 25 is opened and the cushioning corner piece 24 can be removed from the mold.

Figure 23:
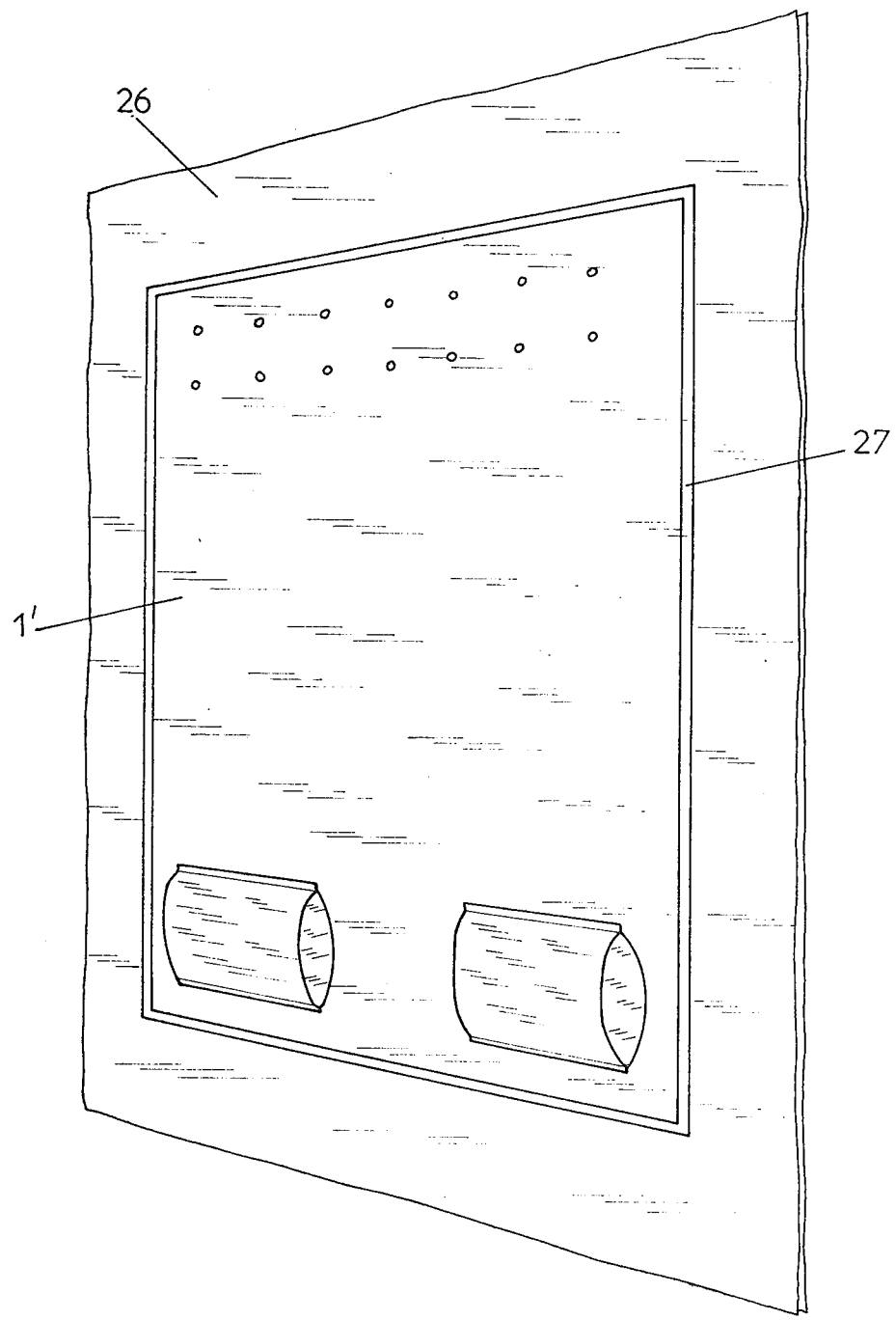
FIG. 23 is a perspective view of a variant of embodiment of the bag according to the invention.

In accordance with a variant of embodiment of the invention, to avoid the use of a cardboard or other box receiving the bag or bags according to the invention or equally banding of shaped half-shells, which does not permit any imperviousness to air, water or dust, it is possible as shown more particularly by FIG. 23 to equip the envelope 1' of the auto-expansible bag over its entire periphery with a drip flap 26 extending to the exterior of the weld of the envelope 1' and intended to be welded to a corresponding drip flap of a corresponding bag in the wrapping of an object. This drip flap 26 is constituted by the edges of the sheets of synthetic material forming the envelope 1', which extend beyond the perimeter formed by the weld seam 27 of the said envelope 1'.

By way of example, a bag according to the invention which possesses dimensions 50×45 cm., an effective volume of 17 liters and a peripheral drip flap 10 cm. in width, is manufactured in the following manner:

Between two superposed sheets of polyethylene, or into a flattened sheath of polyethylene having dimensions of 70×65 cm., the two sachets containing the activated polyol and the isocyanate are placed and the weld defining the auto-expansible bag is executed within its perimeter, and the peripheral drip flap is formed on the outer side of the weld. Then the bag is completed by the operation of perforation of the vent holes.

The utilization of such an auto-expansible bag is effected in the manner described with reference to the bag in FIG. 1. For the wrapping of an object 28 (FIG. 24), a first bag 29 is placed in the lower part 30 of a shaping device, then the object 28 is positioned and covered with a second bag 31. The upper part 32 of the shaping device is then lowered and holds the drip flaps of the two bags, at the level of the plane of junction, during the expansion and polymerization of the foam. The assembly thus obtained is then removed from the mold and the two half-shells surrounding the object 28 in the manner of a cocoon are interconnected by thermal or high-frequency welding of their drip flaps (FIG. 25).

Figure 24:
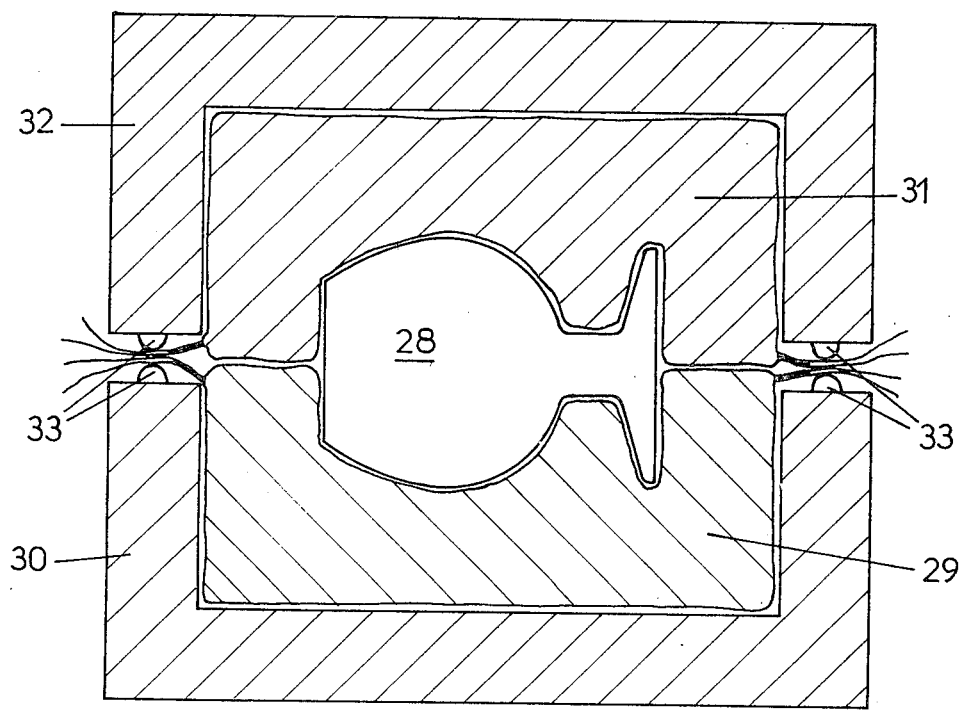
FIG. 24 is a sectional view showing the operation of wrapping an object in bags according to FIG. 23.
Figure 25:
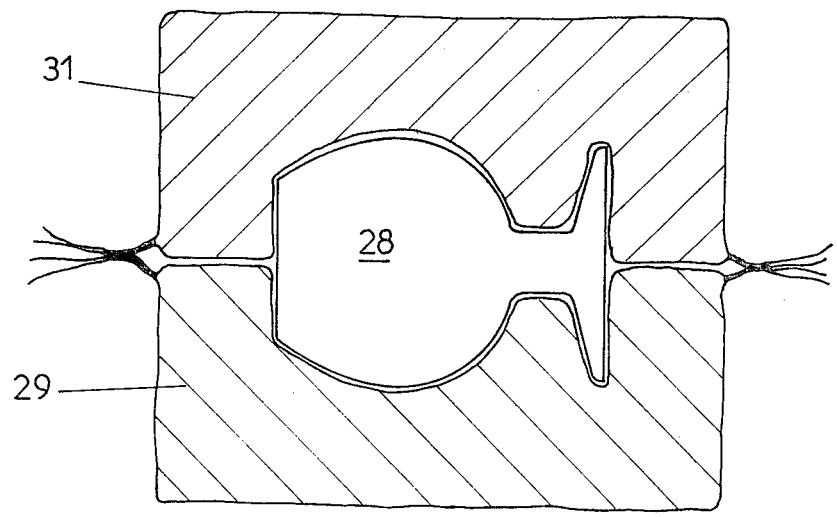
FIG. 25 is a sectional view of the wrapped object according to FIG. 24.

As shown in FIG. 24 the welding of the drip flaps can advantageously be effected simultaneously with the shaping of the half-shells by the incorporation of electrodes 33 in the planes of junction of the lower and upper parts 30 and 32 of the shaping device.

By virtue of this form of embodiment it is possible to produce totally impervious wrappings protecting the wrapped objects against impacts and no longer necessitating boxes or bandings for their retention on the said objects.

Furthermore, by virtue of the imperviousness thus obtained, it is possible to introduce dehydrating sachets into the wrapping before the drip flaps are welded, or to effect evacuation. Finally, such a wrapping is inviolable by reason of the fact that any trace of an attempt at breaking in can be detected immediately.

By virtue of the invention it is possible to effect an insulation, wrapping or filling without the risk of soiling or pollution, as the envelope 1 furthermore imparts to the auto-expansible bag assembly an increased resistance to traction, better capacities for shock-absorption and perfect imperviousness to air and moisture.

By way of example the polyurethane foam is produced from two sachets containing for example in the one:

100 parts by weight of glycol polypropylene of the type known under the commercial name Dow Voranol RH 360, 0.5 to 2 parts by weight of silicone of the type known under the commercial name Dow Corning DC 193, 0.2 to 1 part by weight of tertiary amine activator of the type known under the commercial name Dabco, 2 to 10 parts by weight of water, 5 to 10 parts by weight of fireproofing agent of the type known under the commercial name Phosgard C 22 R, and in the other:

an isocyanate of the methyl-phenyl-diisocyanate type such as that known under the commercial name Bayer Desmodur 44 V 20 at the rate of 110 to 230 parts by weight.

Thus for a bag the envelope of which possesses the dimensions 50×45 cm. and an effective volume of 17 liters, for the manufacture of 14 liters of foam of a density of 25 to 30 g/liter the first sachet contains 114 g of activated polyol and the second sachet contains 209 g. of isocyanate.

It is likewise possible to utilize other foams in connection with the auto-expansible bag according to the invention, such for example as:

What I claim is:

1. A foam of non-inflammable polyurethane-polyisocyanurate, the constituents of which are distributed in two sachets, namely in the one:
   100 parts by weight of phosphorated chlorinated polyol such as that known under the commercial name Solvay UM 235,
   0.5 to 2 parts by weight of silicone of the type known under the commercial name Dow Corning DC 193,
   1 to 5 parts by weight of trimerization activator such as that known under the commercial name Dabco TMR 2 or Polycat 41,
   2 to 5 parts of water,
and in the other:
   180 to 230 parts by weight of methyl-phenyl-diisocyanate of the type known under the commercial name Bayer Desmodur 44 V 20.

2. A non-inflammable phenol foam, the constituents of which are distributed in two sachets, namely in the one:
   100 parts by weight of phenolic resin,
   5 to 30 parts by weight of inflating agent such as trichlorofluoromethane,
and in the other:
   5 to 10 parts by weight of polymerization activator.

3. A non-inflammable polycarbodiimide foam of density 14 to 17 g/liter, the constituents of which are distributed in two sachets, namely in the one:
   100 parts by weight of methyl-phenyl-diisocyanate of the type known under the commercial name Bayer 44 V 20-44 V 10-44 V 40,
and in the other:
   3 to 6 parts by weight of dimerization activator,
   3 to 8 parts by weight of diphenylcresyl-phosphate fireproof additive.

It is likewise possible to introduce the various ingredients entering into the composition of the foam into the envelope 1 by means of more than two sachets if the chemical behavior of the foams to be obtained requires this, or for reasons of convenience in use.

Likewise the various manipulations of the envelope and the sachets both for the expelling of the products and for their mixing and the spreading of the foam, can equally be effected mechanically for example by means of rollers or the like.

Finally the bag according to the invention can equally be used for the immobilization of a human or animal member, in substitution for splints, plaster bandages or the like.

The invention is not of course limited to the forms of embodiment as described and represented in the accompanying drawings. Modifications remain possible, especially from the viewpoint of the constitution of the various elements, without thereby departing from the scope of protection of the invention.

1. An auto-expansible cushioning bag, comprising a completely closed envelope of flexible, impervious and transparent material, and at least two hermetically closed sachets, likewise of flexible, transparent and impervious material, which are disposed in the envelope and contain the ingredients necessary for the production of a curable plastic foam.

2. A bag according to claim 1, in which the envelope is provided in its upper part with vent holes over its entire surface and/or in the lateral weld lines.

3. A bag according to claim 1, in which the sachets enclose the necessary ingredients for the manufacture of a polyurethane foam, the first containing
   100 parts by weight of polypropylene glycol,
   0.5 to 2 parts by weight of silicone,
   0.2 to 1 parts by weight of tertiary amine activator,
   2 to 10 parts of water,
   5 to 10 parts of fireproofing agent,
and the other containing an isocyanate of the methyl-phenyl-diisocyanate type at the rate of 110 to 230 parts by weight.

4. A bag according to claim 1, in which the sachets contain the ingredients necessary for the manufacture of a noninflammable polyurethane-polyisocyanurate foam, the constituents of which are in the one
   100 parts by weight of the phosphoreted chlorinated polyol,
   0.5 to 2 parts by weight of silicone,
   1 to 5 parts by weight of trimerization activator,
   2 to 5 parts by weight of water,
and in the other
   180 to 230 parts by weight of methyl-phenyl-diisocyanate.

5. A bag according to claim 1, in which the sachets contain the ingredients necessary for the manufacture of a noninflammable phenolic foam, the ingredients of which are in the one
   100 parts by weight of phenolic resin,
   5 to 30 parts by weight of blowing agent,
and in the other
   5 to 10 parts by weight of polymerization activator.

6. A bag according to claim 1, in which the sachets contain the ingredients necessary for the manufacture of a noninflammable polycarbodiimide foam, the constituents of which are, in the one
   100 parts by weight of methyl-phenyl-diisocyanate,
and in the other
   3 to 6 parts by weight of dimerization activator,
   3 to 8 parts by weight of fireproof diphenylcresyl-phosphate additive.

7. An auto-expansible cushioning bag according to claim 1, which is provided over its entire periphery, externally of the weld defining its envelope, with a drip flap which can be welded to a corresponding drip-flap of a corresponding bag in the case of the wrapping of an object.

* * * * *